May 27, 1952 — E. W. HOGUE — 2,598,259
SIGNAL AMPLIFYING SYSTEM
Filed Sept. 4, 1948 — 2 SHEETS—SHEET 1

INVENTOR.
EPHRAIM WALTERS HOGUE
BY
ATTORNEY

May 27, 1952     E. W. HOGUE     2,598,259
SIGNAL AMPLIFYING SYSTEM

Filed Sept. 4, 1948     2 SHEETS—SHEET 2

INVENTOR.
EPHRAIM WALTERS HOGUE
BY
D. Clyde Jones
ATTORNEY

Patented May 27, 1952

2,598,259

UNITED STATES PATENT OFFICE 2,598,259

SIGNAL AMPLIFYING SYSTEM

Ephraim W. Hogue, Rochester, N. Y.

Application September 4, 1948, Serial No. 47,810

5 Claims. (Cl. 179—171)

This invention relates to a method of and to apparatus for amplifying the power of an electrical signal where this signal is generated by a transducer having a high internal impedance.

In a conventional amplifying system using a transducer of the mentioned type, the voltage expected at the output of the amplifier is a function of the open circuit voltage of the transducer, the gain of the amplifier, the series impedance of the transducer and the input impedance of the amplifier. However, it has been found that the ratio of amplifier input voltage to transducer open circuit voltage must be substantially independent of the series impedance of the transducer, if all desired frequencies generated by the transducer are to be amplified equally.

The usefulness of a conventional amplifier employing a transducer of the mentioned type, is proportional to the input impedance of the amplifier, which impedance effectively is connected across the input terminals of the amplifier. In general, the mentioned input impedance, is limited to that value of the maximum grid return resistance for the vacuum tube used in the first stage of the amplifier. Another factor involved in the input impedance of the amplifier is the resistance representing the total insulation surface and volume leakage to ground, from the conductor connecting the transducer to the amplifier input. If this conductor is long and is surrounded by a grounded shield providing a large leakage area, great care must be taken to keep the surface and volume resistivity of the insulation surrounding it, at a high value. This surface and volume leakage constitutes an impedance which shunts the transducer terminals and places an upper limit, in conventional methods, to the impedance which can be presented to the transducer.

If the input impedance of the amplifier is not to be limited by the grid return resistance, additional resistance may be inserted in series between the transducer and the grid of the first vacuum tube of the amplifier. But this attenuates the transducer signal so that the amplification effected by the amplifier must be increased to make up for it. However, the amplification may not be increased indefinitely since this would increase the sensitivity of the amplifier to foreign noises such as microphony and magnetic pick-up.

A further limitation on the effectiveness of the conventional arrangement, results from the presence of stray capacitance from the grid and grid conductors, to ground. This capacitance shunts the transducer so that a material reduction in transducer output will result if the capacitance of the transducer is not kept large with respect to it. The use of grounded electrostatic shielding around the conductors leading from the grid increases this capacitance, thereby limiting the usefulness of the prior arrangement.

In accordance with one feature of the present invention, there is provided a novel method and novel apparatus whereby the power output of a transducer having a high internal impedance, can be amplified without encountering the mentioned objectionable limitations of the prior art.

In accordance with another feature of the invention, the electrical signal from a transducer is applied to a suitable load or utilization circuit in which a voltage amplifier is employed in such a manner as to increase the effective impedance presented to the transducer to a value greater than the normal input impedance of said amplifier.

In accordance with another feature of the invention, grounded electrical shielding is employed not only to lower the sensitivity of the amplifier to interfering electrical fields but also to increase the effective impedance presented to the transducer.

A further feature of the invention relates to an arrangement wherein even an imperfect degree of shielding is effective in reducing the sensitivity to interfering electrostatic fields by an amount substantially greater than the same degree of shielding in conventional amplifiers.

Still another feature of the invention relates to an amplifying system in which one terminal of a transducer of the mentioned type is connected to the input terminal of said amplifier while the other terminal of the transducer is connected to the output terminal of the amplifier so that the transducer and the amplifier input as well as the loaded amplifier output form a series circuit.

Another feature of the invention relates to arranging the characteristic of a voltage amplifier so that the amplifying action will reduce the current which is generated by the transducer voltage in said series circuit. In other words, the arrangement provides negative voltage feedback (the output and input voltages of the amplifier being in opposite phase) to provide impedance multiplying action.

The invention will best be understood from the following description and claims when taken with the drawings in which:

Fig. 1 diagrammatically illustrates a circuit arrangement wherein a high impedance transducer is coupled by an amplifier to a utilization network or load in such a manner that the input impedance is effectively multiplied, and wherein a grounded electrostatic shield is employed to remove the limiting effect placed by leakage on the impedance which can be presented to the transducer;

Figure 1:
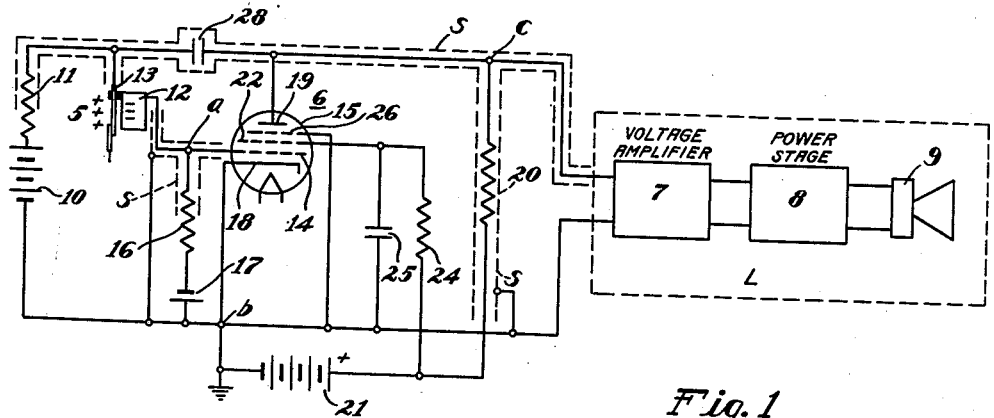

In the form of the invention illustrated in Fig. 1, there is disclosed a condenser type transducer 5, a primary amplifier 6, a voltage amplifier 7, a power stage 8 and a loud speaker 9, coupled together in the order named. The transducer 5 comprises a fixed metal plate 12 mounted in insulated, spaced relation with a movable metal plate 13, the plate 13 being arranged for movement by mechanical vibrations, sound waves or by a phonograph needle. The transducer is preferably of the polarized type having a D. C. source such as a battery 10 connected through the resistor 11 to the transducer plate 13 to maintain a charge thereon. The other transducer plate 12 is connected to the grid 14 of a pentode 15 in the amplifier 6. The grid 14 is connected through the input terminal "a" which is connected through the grid resistor 16, the source of grid bias 17, and terminal "b" of the amplifier, to the cathode 18 of the pentode. The anode 19 of the pentode is connected through the output terminal "c" of the amplifier, anode load resistor 20, amplifier anode voltage supply 21, and the grounded common terminal "b" of the amplifier, to the cathode 18. Screen grid 22 is connected through the resistor 24 to the positive terminal of the anode voltage supply thereby maintaining the screen grid at the proper operating potential It will be understood that the by-passing condenser 25 serves to maintain the screen grid at ground potential with respect to alternating current, while the suppressor grid 26 is connected directly to ground. A blocking condenser 28 connects the anode 19 of the pentode to the plate 13 of the transducer while the resistor 11 serves to prevent the signal on the anode 19 of amplifier pentode tube from being short-circuited to ground, through the polarizing supply 10. A load L which can be the input of the voltage amplifier 7 is connected across the terminals "b" and "c" of the primary amplifier. This voltage amplifier is coupled to a power stage 8 which in turn is coupled to a loud speaker 9. Grounded electrostatic shielding S (represented by parallel broken lines) is placed around transducer leads, and portions of the circuits connected to them to reduce direct leakage between said leads, and to shield against noise pickup.

Figure 4:
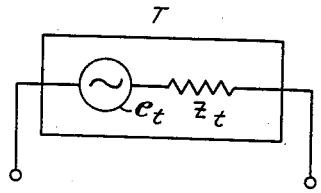
Figs. 4 to 8 are diagrams useful in explaining the invention.
Figure 5:
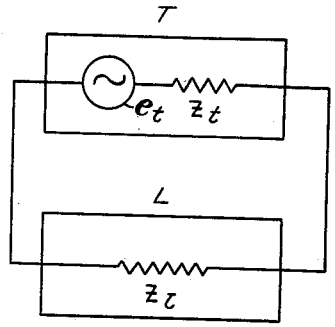

Any transducer T can be described electrically as a zero-impedance generator or source of electromotive force $e_t$ in series with an impedance $Z_t$, which is the equivalent series internal impedance of the transducer (Fig. 4). Before the signal from the transducer can be utilized, it must be developed across some finite load $Z_l$ (Fig. 5), which is the input impedance of whatever device L is connected to the transducer. Thus the voltage delivered by the transducer to the load will always be less than $e_t$, and will depend upon the three quantities $e_t$, $Z_t$, (the impedance of the transducer), and $Z_l$ (the input impedance), which impedances are not necessarily constant. In the use of transducers, it is nearly always desirable that the voltage delivered to the load be as large as possible and be dependent only upon $e_t$. This will always be the case if $Z_l$ is large compared with $Z_t$. But it is quite often true in practice that the impedance of the transducer is considerably higher than that of the load. It then becomes necessary to employ some intermediate device between the transducer and load to prevent the proper high impedance to the transducer, and to transmit the signal undiminished, undistorted, and without the introduction of noise, to the lower impedance load.

To effect the highly desired signal transmission just referred to, there are provided in accordance with the invention, two arrangements which cooperate with each other and with the transducer and load. These arrangements comprise:

(a) a three-terminal electrical amplifier as in Figs. 1, 2, 3, 4, 7, 8, and 9 having a certain transfer characteristic, and (b) a grounded system of conducting electrostatic shielding Figs. 1, 2, 3, 8 and 9.

Figure 6:
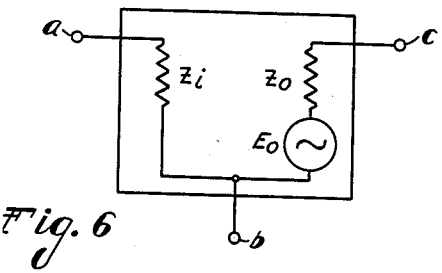
Figure 7:
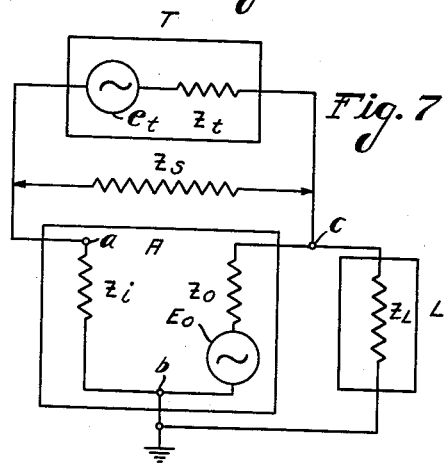
Figure 9:
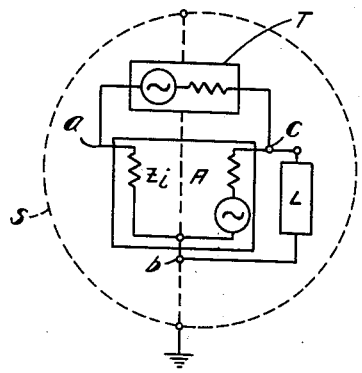
Fig. 9 is a generalized diagram of the invention showing how electrostatic shielding is employed.
Figure 8:
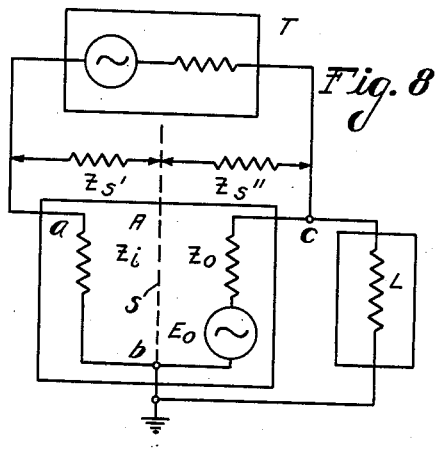

The amplifier, represented by its equivalent circuit in Fig. 6, has an input terminal "a," an output terminal "c," and a grounded terminal "b" to be called henceforth the "common terminal," common to both its input circuit and its output circuit, and an input impedance $Z_i$ existing between terminals "a" and "b." A source of electromotive force $E_o$ existing between the output terminals "b" and "c" and acting in series with the output impedance $Z_o$, develops a voltage $E_2$ across a load connected to "b" and "c" when a voltage $E_1$ is impressed across $Z_i$. Voltage $E_2$ is to be taken as greater than voltage $E_1$, and of opposite phase.

The system of conductive shielding is to be a system of conductors maintained at ground potential and so arranged as in some degree to exclude electrostatic fields from certain portions of the circuit.

Let it be assumed that load L is connected to the output terminals "b," "c" and the transducer T is connected to the input terminal "a" and the output terminal "c" of the amplifier. Let it further be assumed that the transfer characteristic of said amplifier when so connected is arranged such that $$E_2 = -ME_1$$

where M, the gain of the amplifier is a real positive number greater than one, and where the minus sign indicates that there is to be a phase reversal introduced by the amplifier. Then it will be found that as a result of 100% feedback across the load, the impedance seen by the transducer is $(M+1)Z_i$. This will be shunted by whatever stray impedance $Z_s$ happens to exist directly between its leads, see Fig. 7. At the same time, the impedance level existing at the input to the amplifier between "a" and "b" is given by $Z_i$ shunted by an impedance $Z_t/(M+1)$. This results from negative feedback between the output and input of the amplifier through the transducer itself. Also as a result of this same negative feedback, the output impedance of the amplifier is reduced over what it would be without the presence of the transducer.

It is seen that $(M+1)Z_i$, the impedance presented by the amplifier to the transducer depends upon an actual physical impedance $Z_i$ called the normal input impedance of the amplifier and upon M, the gain of the amplifier. Thus while $Z_i$ may be limited by practical considerations to a moderate value, the product $(M+1)Z_i$ can be made many times the value of $Z_i$. After $Z_i$ has been made as large as is practical, the limit on how large $(M+1)Z_i$ can be made depends on how large M can be made practically. Without the presence of inverse feedback, the practicable gain of the amplifier would ordinarily depend on the magnitude of noise sources existing within it, since the effects of these noises in the output would increase directly with M. But if there is inverse feedback of an amount $\beta$ present, the gain $M'$ of the present circuit with inverse feedback present, to these noise sources is given by $$M' = \frac{M}{1+\beta M}$$

It will be seen from the foregoing, that as M approaches infinity, $M'$ approaches $1/\beta$, so that these noise sources do not seriously limit M when inverse feedback is present. Now as has been pointed out, there is inverse feedback between the output and input of the amplifier through the transducer itself, and the amount of this feedback depends on the ratio of $Z_i$ to $Z_t$. Thus the sensitivity of the circuit described, to amplifier noises, is limited not by M but is determined instead by the ratio of $Z_i$ to $Z_t$. In practice, however, M may be increased only until it becomes impossible to eliminate positive feedback through the transducer sufficient to cause oscillation. This positive feedback results from phase shift within the amplifier.

As has been pointed out, the impedance seen by the transducer will be $(M+1)Z_i$ in parallel with $Z_s$ which represents the direct stray coupling between the transducer leads and portions of the amplifier connected to these leads. Thus, there is no point to making $(M+1)Z_i$ much greater than $Z_s$, because the impedance of $Z_s$ and $(M+1)Z_i$ in parallel therewith can not be made larger than $Z_s$ no matter how large $(M+1)Z_i$ is made (see Fig. 7).

This leads to one of the functions of the second mentioned arrangement employed in accomplishing the kind of signal transmission desired, namely, the single grounded system of conductive electrostatic shielding. From comparison of Fig. 8 with Fig. 7 it will be seen how a single system of conductive shielding will, when connected to terminal ground and arranged in space so as to intercept electric field and current paths which run directly between "a" and "c," effectively convert $Z_s$, the direct stray shunt impedance across the transducer into two impedances $Z_s'$ and $Z_s''$ which are stray shunt impedances across the input and output of the amplifier respectively. Thus by increasing the degree of this shielding, thus cutting more field and current paths, $Z_s$ can be made as large as desired and does not, therefore, set an upper limit on the impedance seen by the transducer.

The impedances $Z_s'$ and $Z_s''$ have the following effect on the impedance presented to the transducer. $Z_s'$ which is the same order of magnitude as $Z_s$ shunts $Z_i$, but $Z_i$ will in practice be much smaller than $(M+1)Z_i$ since M will ordinarily be large, so that $Z_s'$ will have a much smaller effect on the impedance seen by the transducer than did $Z_s$. Otherwise expressed, $Z_s'$ now becomes a shunt of $Z_i$, reducing it very slightly (if M is large) to a value $Z_i'$, thus the impedance presented the transducer will now be $(M+1)Z_i'$ which is smaller than its original value $(M+1)Z_i$ in the same proportion as $Z_i'$ is smaller than $Z_i$. But the impedance presented to the transducer can always be brought back to its former value $(M+1)Z_i$ simply by increasing M slightly to a value $M'$ so that $$(M'+1)Z_i' = (M+1)Z_i$$

It is an important feature of the present invention that due to the use of grounded shielding in this manner, the impedance presented to the transducer can always be adjusted to any desired value regardless of the value of $Z_s'$, simply by adjusting M. This result cannot be achieved without the use of the grounded electrostatic shield because without the shield, $Z_s$ then sets an upper limit on the impedance seen by the transducer regardless of the value of M or of any other quantity.

With respect to $Z_s''$, which shunts the output of the amplifier, the output impedance of the amplifier can easily be made so low, in practice, that $Z_s''$ can be neglected.

Figure 2:
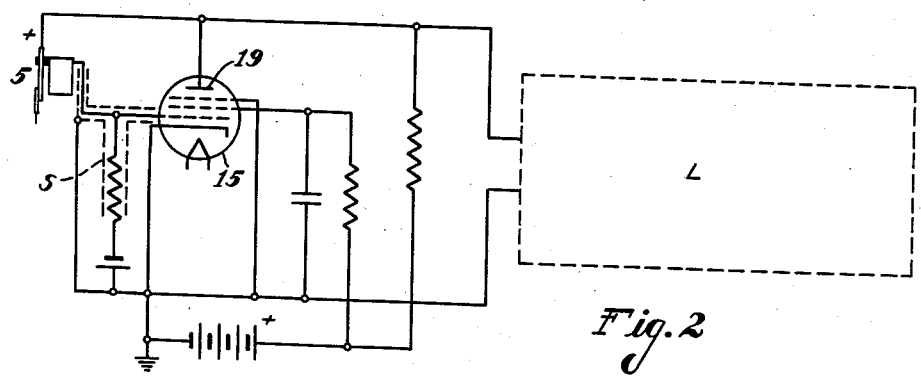
Fig. 2 is a diagrammatic showing of a modified circuit arrangement similar to that of Fig. 1, except that the transducer is polarized in a different manner.

The modified form of the invention illustrated in Fig. 2 is similar to that shown in Fig. 1 except that the polarizing voltage for the transducer 5 is derived from the anode 19 of the amplifier tube 15, thus eliminating the auxiliary battery supply 10, the isolation resistor 11 and the direct current blocking condenser 28 as illustrated in Fig. 1. The operation of this form of the invention will be understood from the description of the circuit arrangement of Fig. 1.

Figure 3:
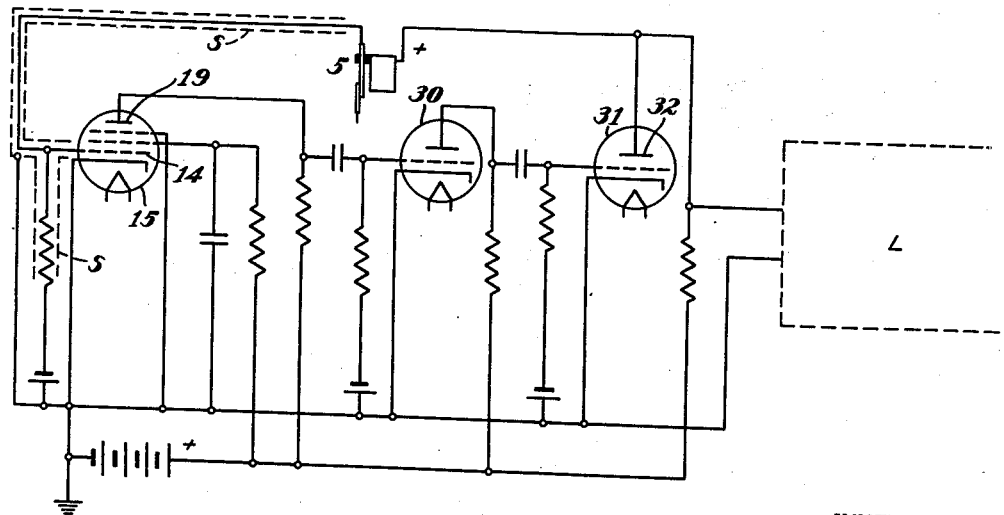
Fig. 3 shows a modified circuit arrangement in which the invention is applied to a multi-stage amplifier.

A further modified form of the invention is illustrated in Fig. 3 wherein a three stage amplifier including the vacuum tubes 15, 30 and 32 is coupled to a polarized condenser type of transducer 5. In this arrangement the voltage at the anode 32 of the vacuum tube 31 in the last stage of the amplifier is used to polarize the transducer 5. However, an auxiliary polarizing supply such as 10 could be used in a multi-stage amplifier. While the amplifier illustrated in Fig. 3 is of the A. C.-coupled type, it will be understood that a D. C. voltage amplifier could be used instead. In a multi-stage A. C. coupled amplifier, precaution must be taken to prevent positive feedback of any frequencies through the transducer sufficient to cause oscillation.

The present invention is characterized by the fact that: it is capable of presenting an extremely high impedance to the transducer, an impedance which is not limited even by stray capacitance and leakage resistance from leads; its sensitivity to electrostatic pickup is low; its sensitivity to internally generated noises is low; and it introduces very little distortion.

What I claim is:

1. In a system of the class described, a signal source, a three-terminal amplifier including an input terminal at signal potential different from ground, an output terminal at a signal potential different from ground, and a common grounded terminal, one pole of said source being connected to said input terminal and the other pole thereof being connected to said output terminal to effect series negative feedback with respect to the source, and grounded electrostatic shielding effectively interposed between all parts of the conductive path between the input terminal and one source terminal, and the conductive path between the output terminal and the other source terminal.

2. In a system of the class described, a signal source having a high impedance of a given value, a three terminal amplifier including an input terminal, an output terminal and a common grounded terminal, a load coupled to said output terminal and to said common terminal, one pole of said source being connected to said input terminal and the other pole thereof being connected to said output terminal, neither pole having any direct connection to ground, said source being thereby coupled to the amplifier to effect substantially 100% series negative voltage feedback thereto, and a grounded shield interposed between substantially the entire connection from one pole of the source to the input terminal, and substantially the entire connection from the other pole of the source to the output terminal.

3. In a system of the class described, a two-pole source of electrical signal voltage having a given internal impedance, a load having a lower impedance, means for amplifying the signal voltage with respect to ground present at one pole of said source, means for coupling said amplified signal voltage to said load, means for coupling the amplified signal voltage to the other pole of said source in opposite phase to that of said first mentioned signal voltage, and means for diverting to ground away from the first mentioned pole and from all conductors directly connected to said pole and operating at the same signal potential with respect to ground, substantially all stray field resulting from the second mentioned pole and from all conductors directly connected to said second pole.

4. In a system of the class described, a two-pole signal source, a load, means for amplifying the signal voltage with respect to ground present at one pole of said source, means for applying said amplified signal to said load, means for applying the amplified signal voltage to the other pole of said source in opposite phase to that of the first mentioned signal voltage whereby an extremely high impedance can effectively be presented to said source, and means substantially eliminating stray leakage between said poles by diverting to ground away from the first mentioned pole and from all conductors directly connected to said pole and operating at the same signal potential with respect to ground substantially all stray fields resulting from the second mentioned pole and from all conductors directly connected to said second pole.

5. In a system of the class described, a two-pole signal generating source having an internal impedance of a given value, an amplifier provided with an input circuit having a normal input impedance and an output circuit, the circuits having respectively an input terminal and an output terminal and having an effectively grounded terminal common to said circuits, said amplifier being coupled to said source by coupling means including a conductive path between the input terminal and one terminal of said source and another conductive path between the output terminal and the other terminal of said source to amplify the power of the signal, a grounded shield effectively interposed between all parts of the conductive path between the input terminal and one source terminal, and the conductive path between the output terminal and the other source terminal, said coupling means and shield effectively multiplying the impedance presented to said source to a value greater than the normal input impedance of said amplifier.

EPHRAIM W. HOGUE.

REFERENCES CITED

The following references are of record in the file of this patent:

UNITED STATES PATENTS

| Number | Name | Date |
|---|---|---|
| 1,822,758 | Toulon | Sept. 8, 1931 |
| 1,948,976 | Wilson | Feb. 27, 1934 |
| 2,123,178 | Bode | July 12, 1938 |
| 2,202,522 | Gloess | May 28, 1940 |
| 2,210,956 | Skillman | Aug. 13, 1940 |
| 2,302,798 | Percival | Nov. 24, 1942 |
| 2,400,953 | Roys | May 28, 1946 |

FOREIGN PATENTS

| Number | Country | Date |
|---|---|---|
| 448,421 | Great Britain | June 4, 1936 |

OTHER REFERENCES

"Radio Engineering," Terman, 3rd ed. p. 373, published 1947 by McGraw-Hill, N. Y.